United States Patent Office 2,884,527
Patented Apr. 28, 1959

2,884,527

CALUTRON PLANT ARRANGEMENT

William P. Dryer, Brookline, Mass., assignor, by mesne assignments, to the United States of America as represented by the United States Atomic Energy Commission Application August 9, 1946, Serial No. 689,483

2 Claims. (Cl. 250—41.9)

The present invention relates to a calutron system, and more particularly to a system arranged to provide for cooling of tank walls.

A calutron unit comprises a tank located between pole faces of a magnet, and means for evacuating the tank to a pressure on the order of $10^{-4}$ to $10^{-5}$ mm. Hg. Inside the tank are positioned electromagnetic apparatus for separating isotopes of an element, as for example, uranium. For a more complete description of a calutron, reference is made to U.S. Patent No. 2,709,222, which issued to Ernest O. Lawrence, on May 24, 1955.

For separation of large quantities of isotopes, a great many individual calutron units are associated together in series relationship in a closed geometrical figure referred to as a racetrack. For a complete description of this type of system, reference is made to U.S. Patent No. 2,721,272, which issued to Ernest O. Lawrence, on October 18, 1955.

During operation of the calutron system, disclosed in the latter mentioned patent, intense heat is produced inside the tank, due to power input, and bombardment of tank walls and other parts of the equipment used. While special cooling lines may be employed to carry heat away from particular areas subjected to local intense heating effects, it is also desirable to provide what may be termed a general air cooling effect and further to withdraw the heated air from the operating area.

With the foregoing general description in mind, it is an object of the present invention to provide efficient cooling of the process tanks in a calutron system.

It is a feature of the present invention to provide a plenum chamber below and coextensive with the series of tanks and magnets making up the calutron system, the plenum chamber being maintained at an elevated air pressure with the air therein cooled, if necessary, and air discharge openings from the plenum chamber into the space between side walls of the process tanks and the adjacent pole faces of the magnets.

Figure 1:
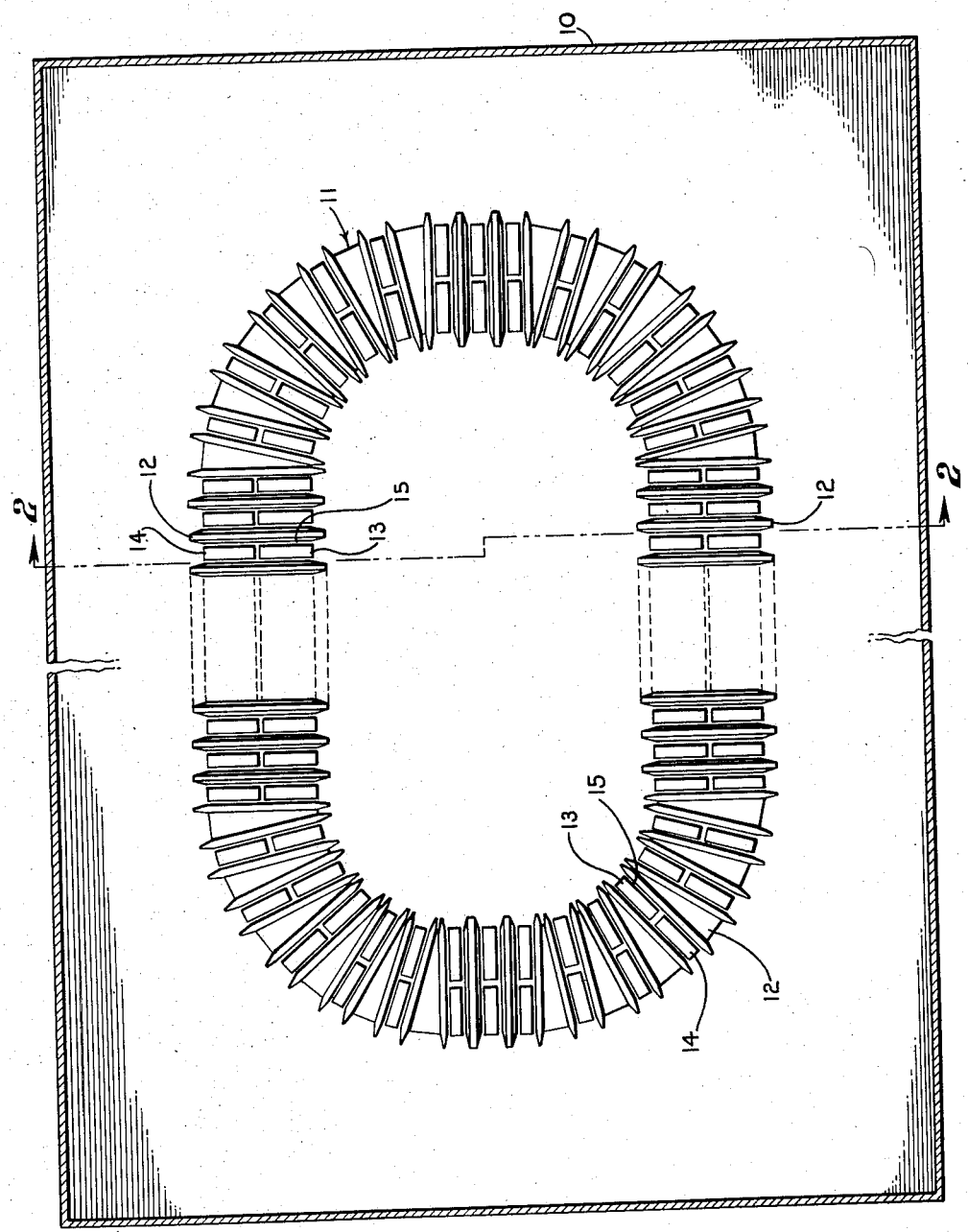
Figure 2:
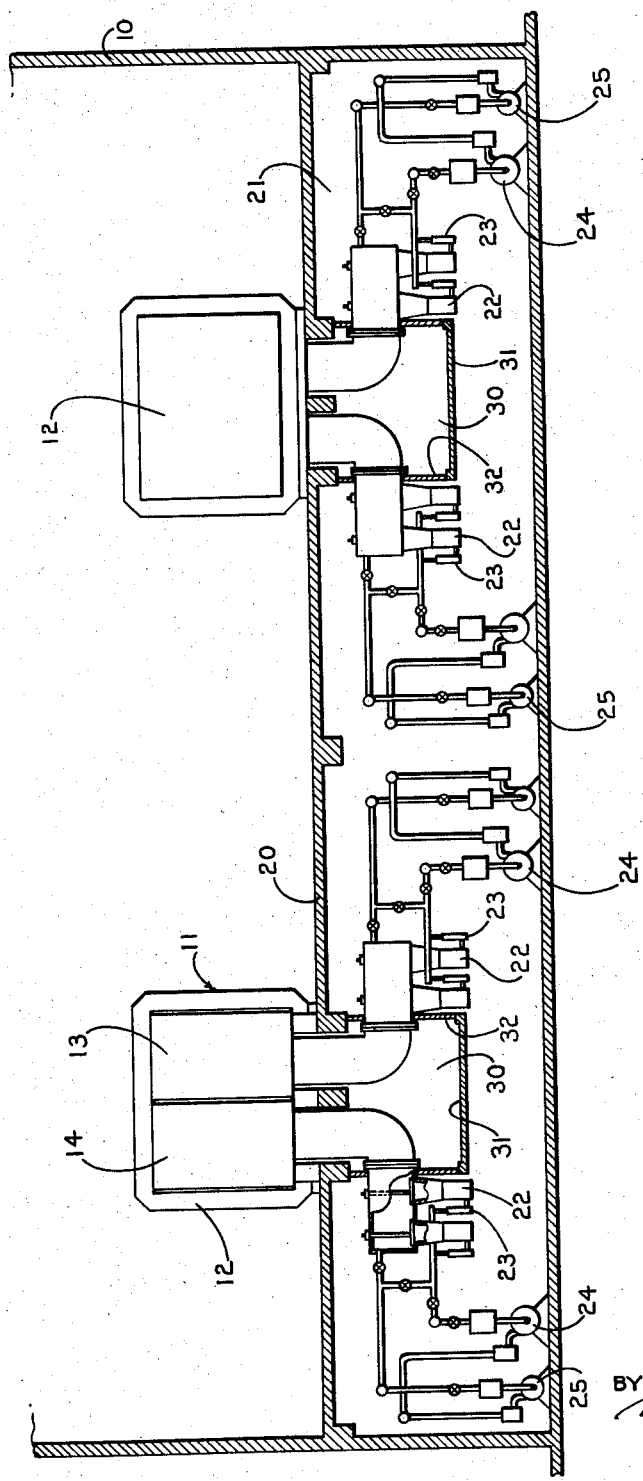

Reference is made to the appended drawings in which Figure 1 is a fragmentary plan view of a calutron system constructed in accordance with the present invention, and Fig. 2 is a vertical section on the line 2—2, Fig. 1.

Referring first to Fig. 1, I have shown a plant working space defined by walls 10 in which is located a calutron system 11 in the form of a closed geometric figure which is made up of alternated electromagnets 12, and process tanks arranged in pairs between the adjacent pole faces of magnets 12. The tanks comprise inner tanks 13 and outer tanks 14, and access to the interior of the tanks is through the vertical edge wall located at the inside of the geometric figure for inner tanks 13, and through the vertical edge wall located at the outside of the geometric figure for the outer tanks 14.

As seen in this figure, the tanks 13 and 14 are spaced slightly from the adjacent pole faces of the magnets, this space being indicated by the numeral 15. In practice, the gap between the tank walls and pole faces will be somewhat less than an inch.

Referring now to Fig. 2, the series of tanks 13 and 14 and magnets 12 is shown as supported on the main working floor 20, below which is a basement space 21 in which are located pumping equipment for evacuating the tanks, including diffusion pumps 22 and 23, and mechanical pumps 24 and 25.

A plenum chamber 30 comprising a floor portion 31 and end wall portions 32, is provided in the basement space 21 extending along and beneath the series of tanks 13 and 14 and magnets 12 supported by the floor 20. The floor 20 is provided with air exhaust slots from the plenum chamber 30 in registry with the spaces or gaps 15 between the side walls of the tanks and the adjacent pole faces of the magnets.

Suitable blowers (not shown) are provided for forcing air into the plenum chamber 30, so as to raise the pressure therein above atmospheric pressure. As a result, air flows in a substantial stream across the side walls of the tanks between the tanks and the adjacent pole faces of the magnets, and serves to carry heat away therefrom. In practice, it is found desirable to provide air vents near the top of the main working space defined by walls 10 and floor 20, so that the heat carried away from the process tanks does not unduly raise the temperature in the working space. Under certain conditions it may be desirable to refrigerate or precool the air under pressure in the plenum chamber.

Ordinarily the plenum chamber 30 will be sectionalized by providing transverse walls at desired intervals. This is particularly advantageous since it is possible to operate only a section of the process tanks in the series and in this case, of course, only the contiguous section of the plenum chamber need be under pressure.

While the illustrated embodiment of my invention is in many ways preferred, it will be appreciated that a substantially similar result may be obtained without the provisions of a separate plenum chamber merely by maintaining the entire basement space 21 under an elevated pressure.

While reference was made to exhausting the heated air from near the top of the working space containing the tanks and magnets, it will also be appreciated that under appropriate climatic conditions, the heated air may be used as an efficient heating medium for the working space.

While I have illustrated and described in considerable detail a complete calutron plant system employing forced air cooling means, it will be appreciated that this has been done merely to enable those skilled in the art to practice the invention, the true scope of which is as indicated by the appended claims.

What is claimed is:

1. In a calutron plant arrangement, a building including a floor separating said building into upper and lower working spaces, a horizontal series of alternated electromagnets and process tanks on said floor and located within said upper working space, said series of magnets and tanks having a closed magnetic path and forming a plurality of heat sources arranged in a closed geometric pattern coextensive with said path, said electromagnets having pole faces spaced from the adjacent walls of said process tanks so as to provide restricted air passages therebetween, said floor having openings therein in registry with said passages, and means located in said lower working space for supplying cooling air under pressure through the openings in said floor and through said restricted passages, said means being disposed in a closed geometric pattern coextensive with said heat source pattern.

2. In a calutron plant arrangement, a building including a floor separating said building into upper and lower working spaces, a horizontal series of alternated electromagnets and process tanks on said floor and located within said upper working space, said series of magnets and tanks having a closed magnetic path and forming a plurality of heat sources arranged in a closed geometric pattern coextensive with said path, said electromagnets having pole faces spaced from the adjacent walls of said process tanks so as to provide restricted air passages therebetween, said floor having openings therein in registry with said passages, and means located in said lower working space for supplying cooling air under pressure through the openings in said floor and through said restricted passages, said means comprising a plenum chamber extending along and beneath the series of alternated tanks and magnets.

References Cited in the file of this patent

UNITED STATES PATENTS

| | | |
|---|---|---|
| 256,053 | Rogers | Apr. 4, 1882 |
| 1,508,018 | Hampton | Sept. 9, 1924 |
| 1,736,002 | Frickey et al. | Nov. 19, 1929 |
| 2,100,691 | Foster | Nov. 30, 1937 |
| 2,112,520 | Crawford | Mar. 29, 1938 |
| 2,217,431 | Baudry | Oct. 8, 1940 |